L. F. PARKHURST & H. G. WEEKS.
ELECTRIC COOKING UTENSIL.
APPLICATION FILED SEPT. 24, 1910.
1,023,754.
Patented Apr. 16, 1912.
2 SHEETS—SHEET 1.
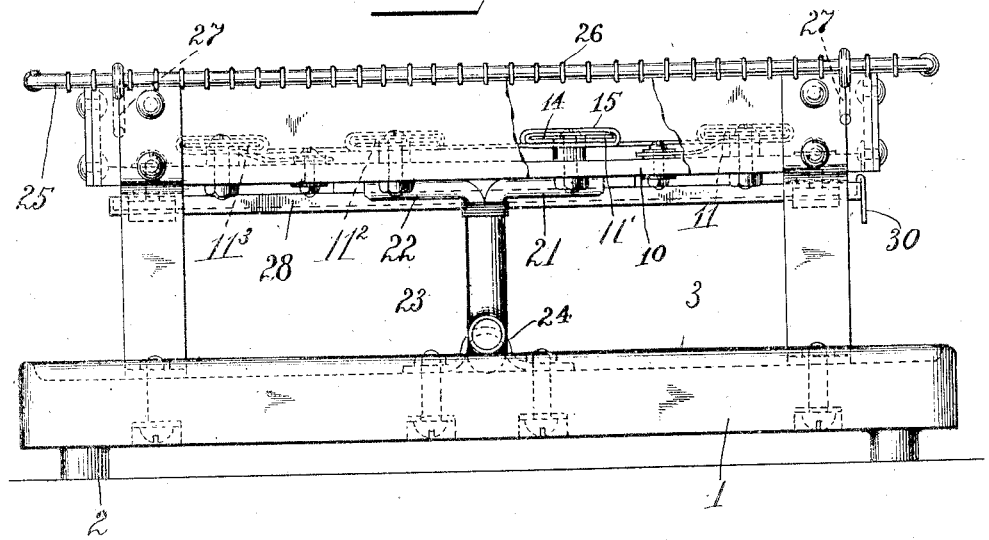
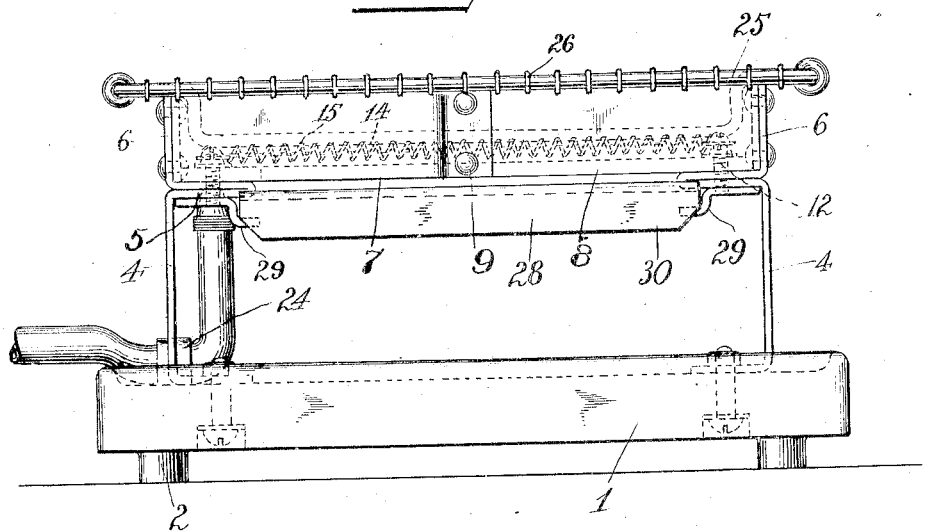
Witnesses:
Inventors:
L. F. Parkhurst
H. G. Weeks

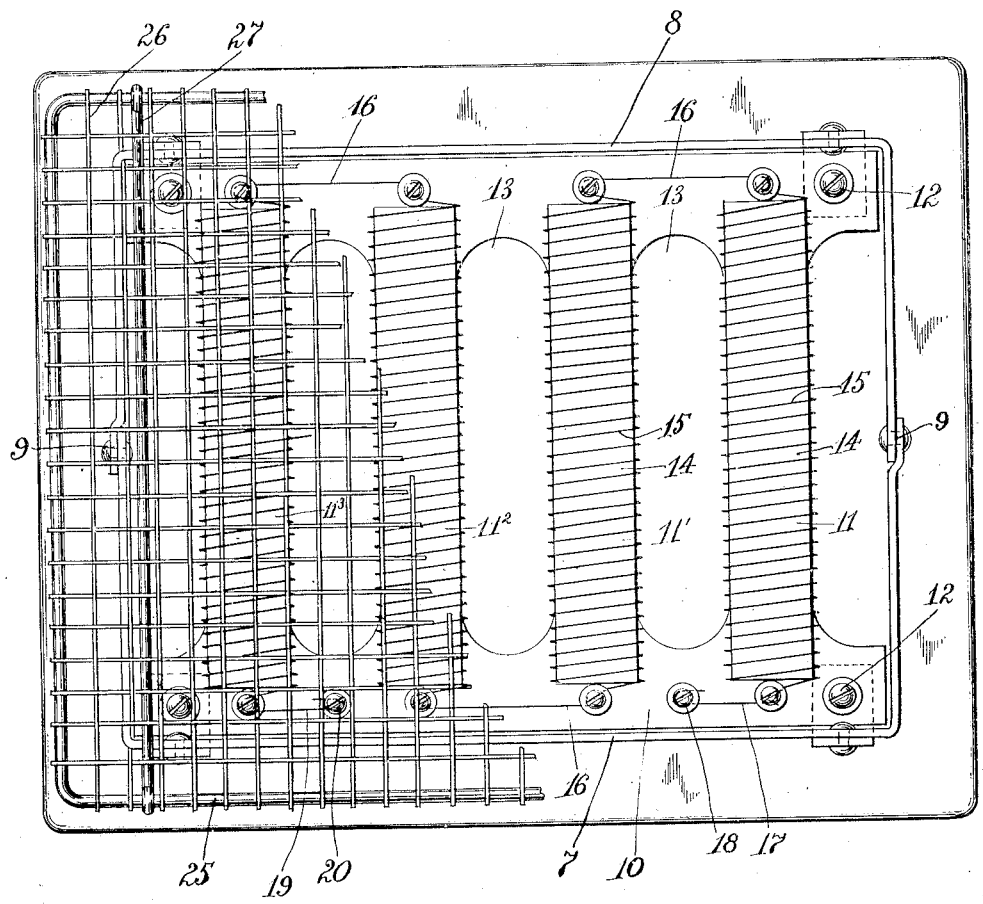

UNITED STATES PATENT OFFICE.

LEON F. PARKHURST AND HARRY G. WEEKS, OF BINGHAMTON, NEW YORK, ASSIGNORS TO DIAMOND ELECTRIC COMPANY, OF BINGHAMTON, NEW YORK, A CORPORATION OF NEW YORK.

ELECTRIC COOKING UTENSIL.

1,023,754. Specification of Letters Patent. Patented Apr. 16, 1912.

Application filed September 24, 1910. Serial No. 583,564.

*To all whom it may concern:*

Be it known that we, LEON F. PARKHURST and HARRY G. WEEKS, citizens of the United States, residing at Binghamton, county of Broome, State of New York, have invented certain new and useful Improvements in Electric Cooking Utensils, of which the following is a full, clear, and exact description.

Our invention relates to electrically heated cooking utensils, and is concerned with a device of this character which is particularly adapted for toasting bread and the like, although it is to be understood that its use is not confined to this purpose, as the device may be employed with advantage for any open grate purpose, and may be used as a source of heat for broiling purposes.

The object of the invention is to provide a device of the above character which shall be of light construction and absorb a minimum amount of heat, which shall be sanitary and in which the support for the article to be cooked may be readily removed to facilitate cleaning and also to afford ready access to the electric heating units and their connections.

A further object is to make the device as compact and simple as possible consistent with effective operation.

With these objects in view, the invention consists in the construction and arrangement of parts, a preferred embodiment of which is illustrated in the accompanying drawings, in which—

Figure 1 is a side elevation of a device embodying the invention. Fig. 2 is an end elevation of the same. Fig. 3 is a plan view, parts being broken away for clear illustration.

The embodiment of the invention herein selected for illustration comprises a base 1, which may be of slate or porcelain, having the feet 2 molded thereon or fixed thereto. The upper side of the base is provided with a raised rim 3 forming a shallow receptacle to retain falling crumbs and the like, and to prevent the same from scattering upon the table. Rising from the base are supporting legs 4, one at each corner, said legs having offsets 5 to support the electric heating units hereinafter to be described. To the upper ends 6 of these legs above the supports 5 is secured the frame of the electric heater proper, said frame consisting preferably of the members 7 and 8 riveted together at their opposite ends at 9. Within the frame so formed is located a supporting slab 10 which carries the heat units 11 $11'$ $11^2$ and $11^3$. This slab is preferably made of asbestos board or like insulating material and rests upon the offsets 5 of the supporting legs, to which it is secured by screws 12. This slab furthermore, is of skeleton form having the long openings 13 through which crumbs and the like may fall to the shallow receptacle at the upper surface of the base.

The heat units proper consist preferably of mica strips 14 upon which the resistance element 15 is successively wound. In the form here shown, the heat units are connected in continuous series by the connections 16. One terminal 17 of the resistance element is connected to the binding post 18 and the opposite terminal 19 to the binding post 20. The binding posts 18 and 20 are provided with connections 21 and 22 respectively, Fig. 1, on the under side of the supporting slab 10 leading to the leading-in cable 23, which is suitably secured to the base 1 at 24, Figs. 1 and 2.

By the above described arrangement of the electrical connections, it will be seen that the supporting slab 10 serves as a convenient insulating terminal block support for the leading-in cables as well as a support for the heat units.

The toast screen or grid consists preferably of a wire frame 25 provided with interlaced cross wires 26, Fig. 3, forming a support for the bread or other article to be heated. The screen or grid is held removably in place by means of the bent cross wires 27, which may be readily slipped into the frame carrying the heating units. This screen or grid also is made as light as possible to prevent the absorption of heat.

It is found in practice that the efficiency of the apparatus may be increased by mounting a metallic reflecting plate beneath the heating units. In some instances, therefore, we prefer to mount such reflecting plate removably beneath said units. A removable plate of this description is illustrated at 28, Figs. 1 and 2, and consists as shown of a shallow pan supported upon brackets 29 secured beneath the offsets 5 of the supporting legs 4. This pan may have a depending end 30 to facilitate insertion and removal.

When a plate of this description is used, it will, of course, serve as a crumb receptacle in lieu of the depressed portion of the base.

While we have herein described a particular embodiment of our invention, it is to be understood that the same may be varied in detail and the relative arrangement of parts without departing from the spirit and scope thereof.

What we claim is:

1. An electrically heated cooking device comprising an insulating base having a crumb receptacle at its upper face, a skeleton frame supported from said base, a skeleton insulating support carrying one or more heating units supported in said frame, and a grid removably mounted in said frame over said heating units.

2. An electrically heated cooking device comprising a base molded of insulating material and having a crumb receptacle formed in its upper face, a frame supported from said base, a slab of insulating material supported in said frame and carrying a plurality of electric heating units, said slab having openings to permit the free passage of crumbs and the like to said crumb receptacle, and a screen or grid supported on said frame and having means to retain the same removably in position thereon.

3. An electrically heated cooking device comprising a frame, a plurality of supporting standards for said frame, said standards having offsets extending within the frame, an insulating slab supported upon said offsets within the frame and carrying a plurality of heating elements, terminal posts in said slabs to receive the terminals of said elements and adapted also to receive the terminals of the leading-in cable, and a grid carried by said frame.

4. An electrically heated cooking device comprising a frame, supports therefor, an insulating slab supported in said frame and carrying one or more electric heating units, said slab serving also as a terminal block for the resistance element of said unit, a grid removably supported on said frame, and a removable reflecting plate mounted beneath said heating units.

5. An electrically heated cooking device comprising a frame, supports therefor, an insulating slab supported in said frame and carrying one or more electric heating units, said slab serving also as a terminal block for the resistance element of said unit, a grid removably supported on said frame, and a removable reflecting plate mounted beneath said heating units and comprising a shallow pan having means to facilitate the insertion in and removal from the device.

LEON F. PARKHURST.
HARRY G. WEEKS.

Witnesses:
ISRAEL T. DEYO,
C. H. HITCHCOCK.